April 21, 1936.  R. A. BRADLEY  2,038,265
TRAILER VEHICLE
Filed April 19, 1935  2 Sheets-Sheet 1
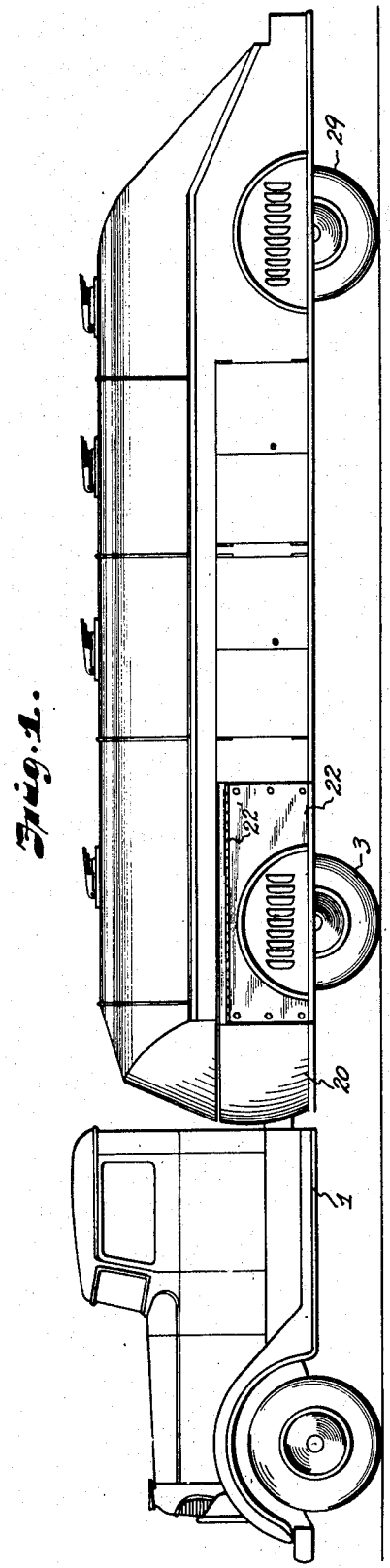
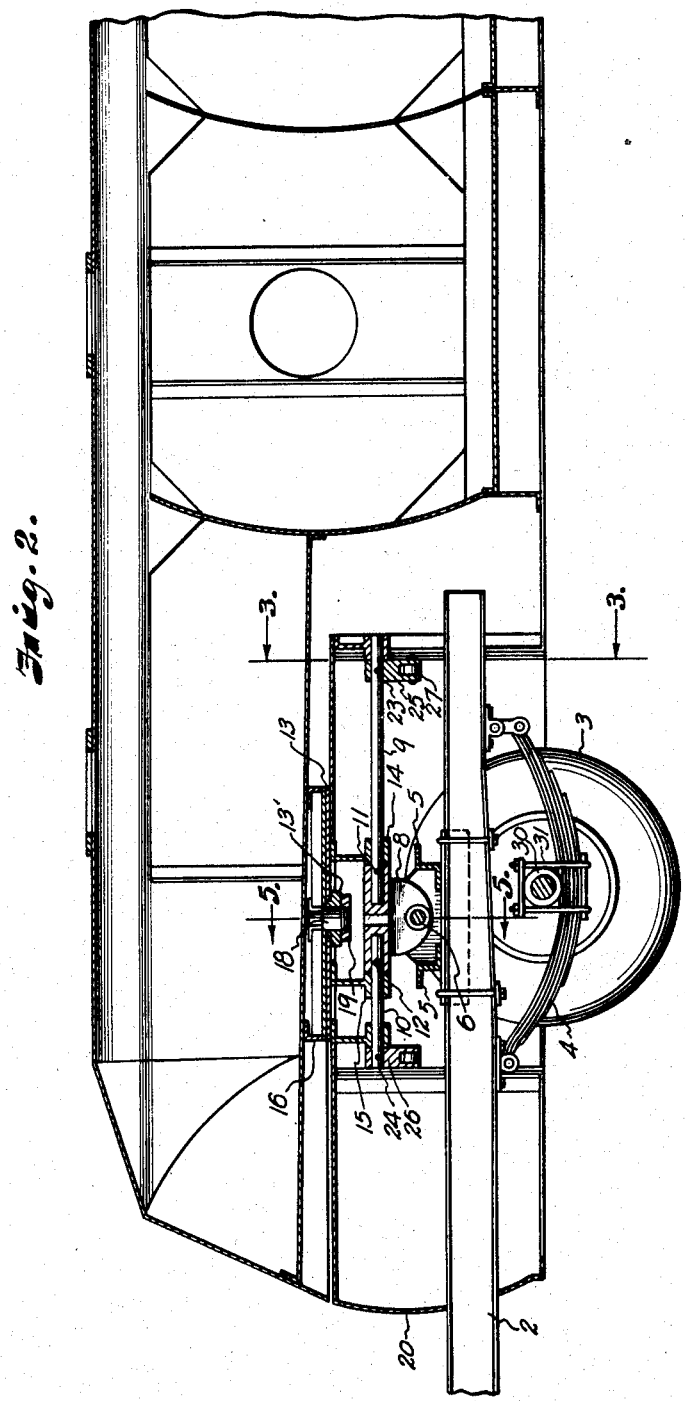
INVENTOR
Ralph A. Bradley
BY
ATTORNEY

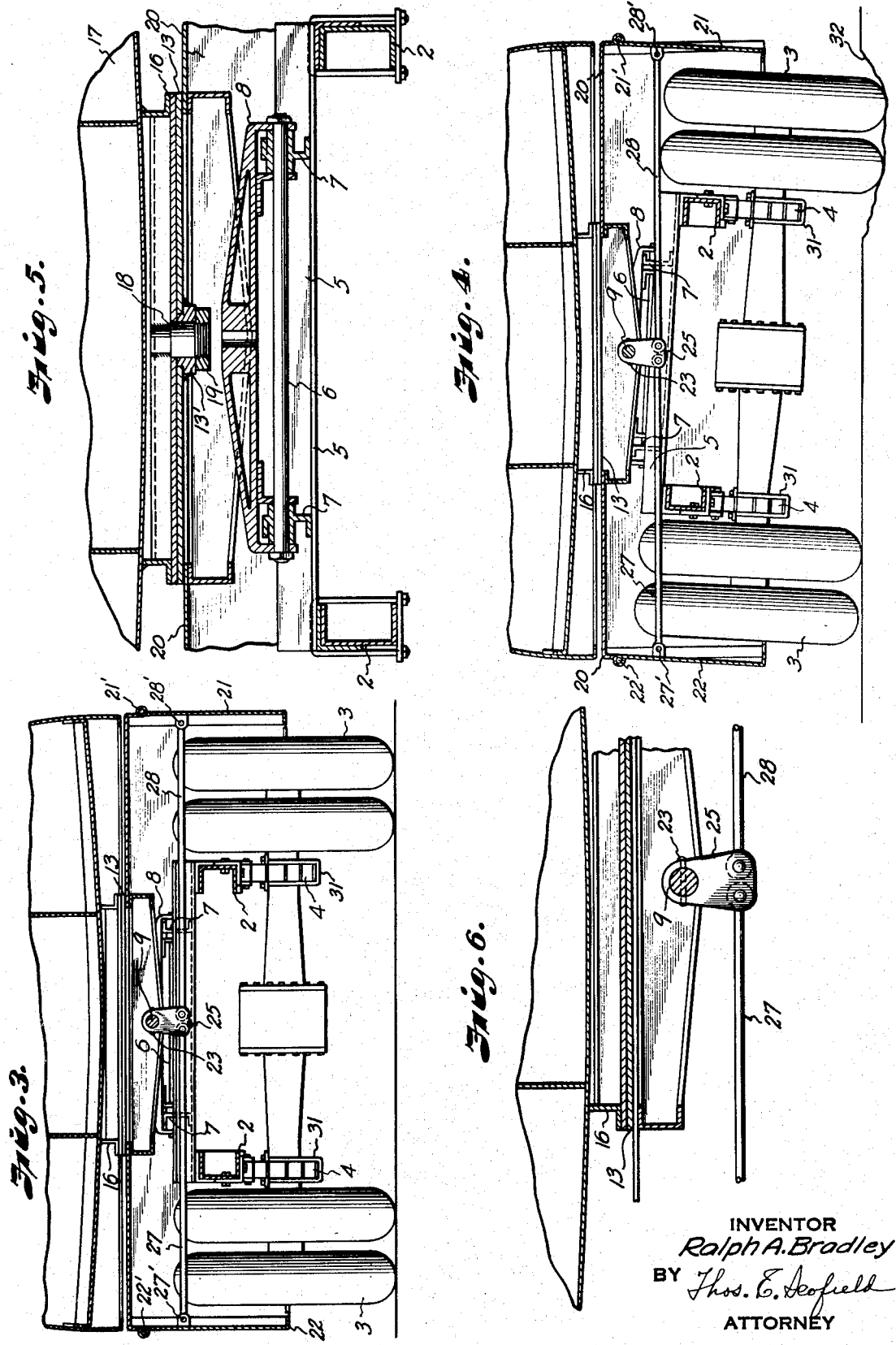

Patented Apr. 21, 1936

2,038,265

UNITED STATES PATENT OFFICE 2,038,265

TRAILER VEHICLE

Ralph A. Bradley, Minneapolis, Minn., assignor to Butler Manufacturing Company, Kansas City, Mo., a corporation of Missouri Application April 19, 1935, Serial No. 17,230

5 Claims. (Cl. 280—153)

My invention relates to trailer vehicles and more particularly to an improved trailer tank assembly.

In hauling large loads of gasoline, lubricating oils, fuel oils, and other liquids, it has been found that these can be transported more rapidly and safely by trailer tanks, due to the fact that the center of gravity of the load in a trailer tank is lower than that in a truck tank. Furthermore, tanks having a larger capacity can be built and moved by vehicles of much smaller dimensions. This is analogous to the advantage of a towed vehicle over a pack horse.

Due to the vast improvement in highways, trailer tank vehicles now travel at comparatively high speeds. It has been conclusively shown that stream lining automotive vehicles reduces their wind resistance and thus reduces the load upon the motor making for higher speeds and decreased fuel consumption.

It has been hitherto unfeasible to sheath the driving wheels by supporting sheathing from the towing vehicle. This follows because there is a statutory limit as to the width of vehicles of the instant nature. The dimensions allowed by law are usually taken advantage of to obtain a vehicle having the greatest capacity possible in order to increase the pay load. The rear wheels of the towing vehicle which are mounted on springs have a considerable amplitude of angular motion around a longitudinal axis. In order to use stationary sheathing, the clearance would have to be so large that the width allowed by law would be taken up by spacing the sheathing laterally from the wheels which would necessitate making the vehicle proper narrower and thus reduce the pay load.

The use of sheathing not only stream lines the assembly and thus reduces its aerodynamic resistance, but also prevents dust and dirt from blowing into the fifth wheel construction causing abrasion and wear. Then, too, the appearance of the assemblage is enhanced by the sheathing.

One object of my invention is to provide a trailer tank vehicle having sheathing protecting the fifth wheel.

Another object of my invention is to provide a trailer tank construction in which sheathing is provided in order to give the trailer tank assembly a stream line surface for the flow of air occasioned by motion.

Other and further objects of my invention will appear from the following description.

In the accompanying drawings which form part of the instant specification and are to be read in conjunction therewith and in which like reference numerals are used to indicate like parts in the various views;

Figure 1 is a side elevation of a trailer tank assembly embodying my invention.

Figure 2 is a sectional view on an enlarged scale, of a portion of the assembly shown in Figure 1, showing one embodiment of my invention.

Figure 3 is a sectional view taken on a line 3—3 of Figure 2.

Figure 4 is a view similar to Figure 3, showing the position of the parts when one of the wheels of the towing vehicle occupies a rut or depression in the road surface.

Figure 5 is a sectional view taken on a line 5—5 of Figure 2.

Figure 6 is a sectional view similar to Figure 3, on an enlarged scale.

In general, my invention contemplates the provision of a fifth wheel construction in which an upper turntable is rigidly mounted on a trailer tank or vehicle. The lower turntable of the fifth wheel is universally mounted on a towing vehicle. Sheathing or skirting is supported from the lower, universally mounted portion of the fifth wheel construction. Hinged panels are provided in the region of the rear wheels of the towing vehicle and means are provided for moving the panels in conformity with the movement of the wheels of the towing vehicle to provide clearance of the skirting panels in tilted positions of the wheels.

More particularly referring now to the drawings, a towing vehicle 1 is provided with a frame 2 which is supported on ground wheels 3 through springs 4. Transverse structural members 5, secured to the frame 2 support a transverse shaft 6 through bearing members 7. Pivoted to shaft 6 is a supporting bolster 8 which carries longitudinal shafts 9 and 10 which are secured to member 8 by means of pins 11 and 12, respectively. The lower turntable 13 of the fifth wheel construction is pivotally supported from shafts 9 and 10 by means of brackets 14 and 15. The upper turntable 16 of the fifth wheel construction is secured to the under side of the tank 17 as can readily be seen by reference to Figure 5. The king pin 18 is secured to the upper turntable 16 and is adapted to fit in a socket member 13' of the lower turntable 13, as can be readily seen by reference to Figures 2 and 5. When assembled, the king pin is held in its socket by means of nut 19. Secured to the lower turntable 13 in any suitable manner is sheathing 20, the forward part of which is rounded. Skirting panels 21 and 22 are pivotally hung from sheathing 20 in the region of ground wheels 3, as can readily be seen by reference to Figures 1, 3, and 4. Secured to shafts 9 and 10 by means of pins 23 and 24 are links 25 and 26. Tie rods 27 and 28 are pivoted to links 25 and 26 and are pivotally secured to the pivoted skirting panels 21 and 22 as can readily be seen by reference to Figures 3 and 4.

In operation, the weight of the towed or trailer vehicle is supported at the rear end thereof by ground wheels 29. The forward portion of the trailer vehicle is supported through the fifth wheel construction, the weight being transmitted through upper turntable 16, lower turntable 13, brackets 14 and 15, shafts 9 and 10, member 8, shaft 6, bearing members 7, transverse members 5, frame 2, springs 4, to ground wheels 3, through the axle 30 of the towing vehicle to which the springs 4 are secured by clamps 31.

The tension of towing and the thrust of braking are transmitted through the king pin 18. The pivoting of the assembly around shaft 6 accommodates for variations in the road in the direction of movement. The pivoting around shafts 9 and 10 accommodates for the lateral irregularities in the road and the twisting which would be occasioned by ground wheels 3 being in a different transverse plane than ground wheels 29. Movement of the frame 2 of the towing vehicle with respect to the tank vehicle or movement of the tank vehicle with respect to the frame would produce a tilting which would ordinarily bring one of the skirting panels 21 or 22 in contact with one of the ground wheels 3. In the construction of my invention referring now to Figure 4, it will be seen that relative movement of the trailer vehicle with respect to the chassis of the towing vehicle will produce the condition shown in the figure in which ground wheels 3 on one side are in a rut 32. The tilting motion produced by the relative movement produces a relative rotation of shafts 9 and 10. Since links 25 and 26 are secured to shafts 9 and 10 for rotation therewith, the result is, in the condition shown in Figure 4, to move links 25 and 26 relatively in a clockwise direction as viewed in the figure. This movement pulls tie rods 28 and thrusts tie rods 27, thus pivoting panels 21 and 22. It will be noted that panels 21 and 22 are pivoted at 21' and 22'. The construction is such that the distance from the pivot 21' to the point of attachment 28' of the tie rod on the panel 21 and the distance from pivot 22' to point of attachment 27' on the panel 22 are each equal to the distance from the axis of shaft 9 to the point of attachment of the tie rods 27 and 28 on link 25 so that the panels are maintained parallel to the plane running through the axis of shafts 9 and 10 and links 25 and 26. It will be readily appreciated that, since member 8 is secured to the chassis 2 and supported against rotation about a longitudinal axis, and shafts 9 and 10 are supported by member 8 and secured against rotation relative to member 8, and links 25 and 26 are secured to shafts 9 and 10 and held against relative rotation thereto, that the vertical plane running through the axis of shafts 9 and 10, and links 25 and 26 will always occupy the same relative position with respect to the horizontal plane of the frame 2. Since skirting panels 21 and 22 are constrained to assume positions parallel to the vertical plane passing through links 25 and 26, these panels will always occupy a substantially fixed relative position to the frame 2, irrespective of movement of the towing vehicle around a longitudinal axis. It will readily be appreciated that it is this movement which would otherwise cause skirting panels 21 and 22 to contact ground wheels 3. It will be noted that the wheel panels are fitted with ventilating louvres. In hauling heavy loads at high speeds, the tires generate heat. The louvres permit a flow of air over the tires and carry away the heat, keeping the tires cool.

It will be clear that I have accomplished the objects of my invention. I have provided a towing vehicle and trailer vehicle assembly provided with a skirting which will reduce wind resistance and protect the fifth wheel from dust and dirt thus reducing the abrasion.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a trailer vehicle assembly, a tractor vehicle having wheels, a trailer vehicle, ground wheels supporting the rear end of the trailer vehicle, a fifth wheel having upper and lower turntables, said lower turntable being movably supported on said tractor vehicle for motion about a longitudinal shaft and a transverse shaft, said upper turntable being rigidly secured to said trailer vehicle at the forward end thereof, skirting supported by said lower turntable, said skirting being provided with hinged panels in the region of the tractor vehicle wheels, an arm secured to said longitudinal shaft, tie rods extending from said arm to said panels, the construction being such that the panels are pivoted in response to movement of the tractor relative to the trailer.

2. In a trailer vehicle assembly, a tractor having a frame, ground wheels supporting said frame, a trailer, ground wheels supporting the rear end of the trailer, a fifth wheel construction having upper and lower turntables, a transverse shaft mounted on a tractor frame, a bolster pivoted to said transverse shaft for movement about a transverse axis, a longitudinal shaft carried by said bolster, the upper turntable of said fifth wheel construction being supported by said longitudinal shaft for movement about a longitudinal axis, said upper turntable being supported by said lower turntable and supporting the forward end of said trailer, skirting supported from said lower turntable, said skirting being provided with hinged panels in the region of the tractor wheels, and means for pivoting said panels in response to movement of the tractor relative to the trailer.

3. In a trailer vehicle assembly, a tractor, a trailer, ground wheels supporting the rear end of the trailer, a transverse shaft mounted on said tractor, a bolster pivotally mounted on said transverse shaft for movement about a transverse axis, a longitudinal shaft carried by said bolster, a lower turntable of the fifth wheel construction pivotally mounted on said bolster shaft for movement about a longitudinal axis, an upper turntable, a vertical pin for rotatably securing said upper turntable to said lower turntable, said upper turntable supporting the forward end of said trailer, pivotally mounted skirting extending across the wheels of the tractor supported from said lower turntable and means actuated by the relative movement between trailer and tractor for pivoting said skirting.

4. In a trailer vehicle assembly, a tractor having a frame, ground wheels for supporting said frame, a trailer, ground wheels supporting the rear end of said trailer, a fifth wheel construction mounted on said tractor for supporting the forward end of said trailer, hingedly mounted skirting in the region of said tractor wheels, and means actuated by the relative movement of tractor and trailer about a substantially longitudinal axis for swinging said skirting.

5. In a trailer vehicle assembly, a tractor having a frame, ground wheels for supporting said frame, a trailer, ground wheels for supporting the rear end of said trailer, a fifth wheel construction mounted on said tractor frame for movement about longitudinal and transverse axes, said fifth wheel construction supporting the forward end of said trailer, hingedly mounted skirting for said tractor wheels and means for swinging said skirting in response to movement of said tractor with respect to said trailer.

RALPH A. BRADLEY.